Sept. 13, 1966  J. NEMEC  3,272,244
DOVETAILING MACHINE
Filed Oct. 2, 1963  3 Sheets-Sheet 3
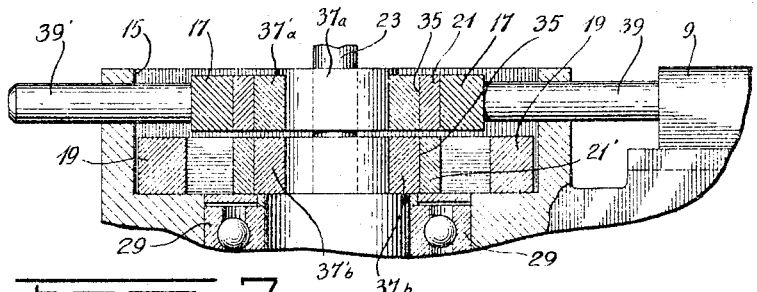
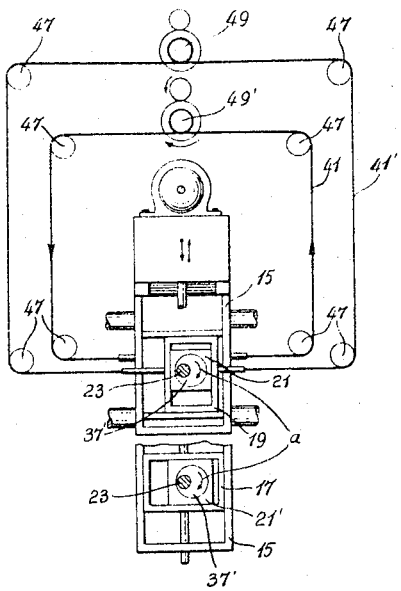
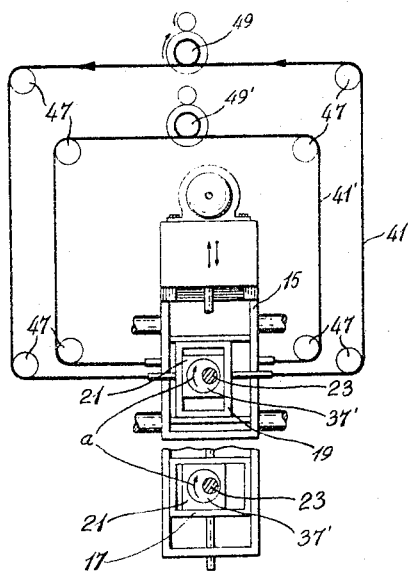
INVENTOR
Joseph NEMEC
BY
ATTORNEYS

United States Patent Office 3,272,244
Patented Sept. 13, 1966

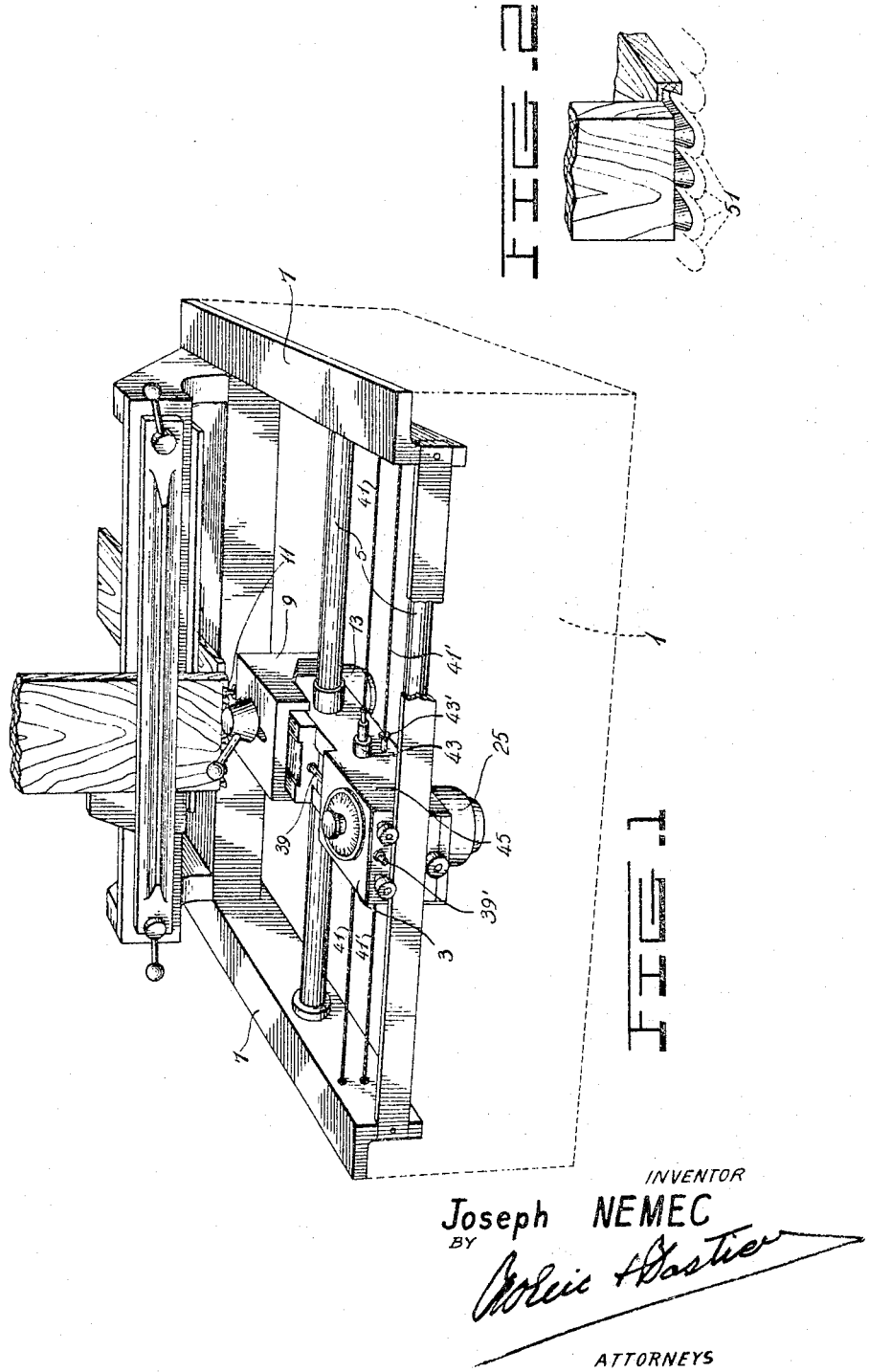

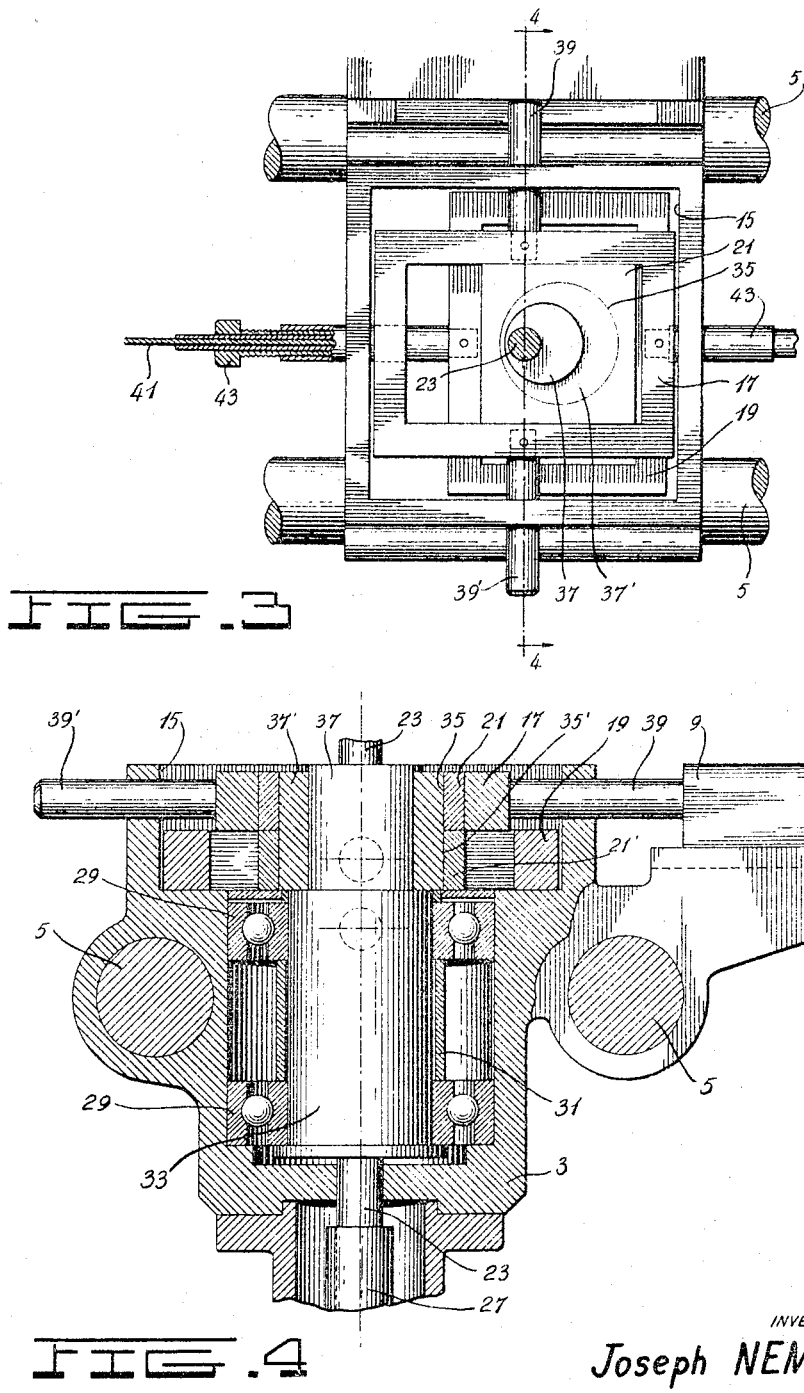

3,272,244
DOVETAILING MACHINE
Joseph Nemec, Cite St-Laurent, Quebec, Canada, assignor of fifty percent to Nicholas Monastyrsky, Montreal, Quebec, Canada
Filed Oct. 2, 1963, Ser. No. 313,207
8 Claims. (Cl. 144—87)

The present application relates to a machine for automatically imparting a harmonic motion to a cutting tool or the like. More specifically, although not restrictively so, the invention pertains to an automatic dovetailing machine for producing simultaneously both male and female elements of dovetail joints on articles of wood, synthetic material or any other materials to be interconnected by dovetail joints.

The invention relates to an apparatus of the type described in U.S. Patent No. 2,747,627 of May 29, 1956. In this patent, a copying body mounted at one end of a shaft was made to follow a circular opening in a template. The shaft being so mounted on a movement producing device as to impart to a first shaft a rectilinear reciprocating motion and to a second shaft a circular reciprocating motion. Both shafts were made to extend through the carrier which was only allowed transversal displacement. The tool bed itself was mounted below the carrier and allowed longitudinal displacement in relation to the displacement of the carrier. Alternating movement of the tool bed was afforded by the alternating circular movement of the aforesaid first shaft which was connected to the bed through two links, one of which had one end rigidly connected to the reciprocating shaft while the other had one end articulated to the tool bed and the two free ends of the links were articulated to one another. Thus, the reciprocating circular movement of the aforesaid first shaft allowed a reciprocating longitudinal displacement of the tool bed.

However, it was found in practice that as soon as the cutting tool become dull or the frictional resistance between the carrier and the tool bed increased due to rust or other causes, it was difficult to obtain constant speed of harmonic displacement of the cutting tool, the movement being jerky. This situation is attributed to the leverage action of both the aforesaid links and of the copying body and movement transmitting shaft means. Any resistive force generated by the cutter or the sliding action of the cutter bed being substantially increased by the said lever mechanisms.

Furthermore, the dovetailing machine of the said patent was found to be difficult of adjustment on account of the complexity of its mechanism.

It is therefore a main object of the invention to overcome the aforesaid difficulties by providing a dovetailing machine wherein the mechanism necessary to produce harmonic motion of the cutting tool is located directly in the carrier so as to avoid magnifying of any resistance by the leverage action of component parts such as in the above mentioned patent.

Another important object of the invention resides in the provision of a machine of the above mentioned type which is much more simple in both operation and structure thus less likely to give rise to maintenance troubles. In this respect, it is again pointed out that most of the machine movement control equipment is located within the carrier itself.

The aforesaid objects may be obtained with a machine according to the invention for automatically imparting a harmonic motion to a cutting tool or the like, which machine comprises: a carrier; means on which said carrier is freely mounted for displacement longitudinally of said machine; a tool bed slidably mounted on said carrier for alternating movement transversely of said machine; a first frame, within said carrier connected to said tool bed for imparting thereto a transverse displacement; a second frame, within said carrier, displaceable longitudinally thereof; a block within each of said frames, displaceable relatively to the frame, in a direction normal to the direction of displacement of the corresponding frame relative to the carrier; a rotatable shaft extending through both said blocks; a circular cam mounted on said shaft and cooperating with an aperture in both said blocks for slidably mounting said blocks in said frames; independent unidirectional holding means for both said carrier and said second frame operable in reverse directions so that said carrier remains stationary when said second frame is moved in one direction by said cam acting on the second frame block and said second frame remains stationary when said carrier is moved in a direction reverse said one direction by said cam acting on the second frame block.

Preferably, the holding means comprises two cables the ends of which are connected to the sides of the carrier and of the second frame, respectively, and form two closed circuits. In each circuit is provided a unidirectional clutch for the corresponding cable, allowing movement of the cables in reverse directions.

Further objects and other advantages of the invention will become apparent as the following description of a preferred embodiment of the invention proceeds having regard to the annexed drawings wherein:

FIGURE 1 is a perspective view of a dovetailing machine equipped with the apparatus of the invention;

FIGURE 2 illustrates parts of two edge abutting wooden members positioned as mounted on the machine and provided with the male and female parts of the dovetail made with the machine of FIGURE 1;

FIGURE 3 is a plan view of the mechanism of the invention;

FIGURE 4 is a cross-section on line 4—4 of FIGURE 3;

FIGURES 5 and 6 are operational diagrams of the machine according to the invention.

FIGURE 7 is a view similar to FIGURE 4, but of an embodiment which permits independent adjustments for pitch and depth.

In FIGURE 1 is shown a machine 1 equipped with the apparatus of the invention which comprises a carrier 3 displaceable transversely of machine 1 as by being slidably mounted on two stationary guide bars 5 secured to the lateral frame members 7 of machine 1.

Slidably received, in any known manner, over carrier 3 and displaceable longitudinally of the carrier or in a direction normal to the direction of displacement of the carrier, is the tool bed 9 carrying tool 11 driven into rotation by means of motor 13 also mounted on the tool bed 9.

As illustrated in FIGURES 3 and 4, within a quadrilateral housing 15 of the carrier 3 are mounted a first quadrilateral frame 17 and a second equally quadrilateral frame 19 below the first frame. First frame 17 is made to be displaceable transversely of the carrier while the second frame 19 is made to move longitudinally of the carrier and therefore in a direction normal to the direction of movement of the first frame. Within each frame is provided a block 21 for the first frame and 21' for the second frame, each block being slidable within its frame in a direction normal to the direction of displacement of its frame.

As best illustrated in FIGURE 4, a driving shaft 23 driven by motor 25 (FIGURE 1) through a coupling 27 and any suitable speed reducing mechanism, extends through both blocks 21 and 21'. The shaft 23 may be mounted in carrier 3 in any known manner such as by rotating in ball bearing 29 suitably kept distant by means of a spacer sleeve 31. For smoother action of the device, it is proposed to have shaft 23 mounted on bearings 29 through an enlarged section 33 thereof.

Blocks 21 and 21' are provided with registering apertures 35, 35' into which are snugly fitted an inner disc 37, eccentrically mounted on shaft 23, and an outer disc 37' fitting around inner disc 37 and also eccentric with regard to shaft 23. It should be pointed out at this time that in normal operation of the device eccentric discs 37, 37' are locked together, in known manner, to act as a unit for a purpose to be determined later.

First frame 17 is connected to the tool bed 9 by means of a forward rod 39 slidably extending through the forward wall of housing 15 whereas a rearward rod 39', which extends through the rearward wall of housing 15, is connected to the other side of the frame 17.

As to the lower frame 19, its displacement is controlled by means of an independent unidirectional holding means which includes a cable 41, both ends of which are secured to ferrules 43, each fixed to a side of the frame 19. The ferrules slidably extend through the lateral walls of housing 15. Cable 41 may be connected to ferrule 43 by any known coupling means.

A second independent unidirectional holding means also controls the displacement of carrier 3 and likewise includes a cable 41' (FIGURES 1, 5 and 6), the ends of which are connected directly to the lateral walls 45 (FIGURE 1), as by a ferrule 43'.

As illustrated in FIGURES 5 and 6, cables 41 and 41' are wound in a closed circuit as by being trained around suitable pulleys 47. The unidirectional holding means further includes any known unidirectional clutches 49, 49' through which cables 41 and 41' extend. Clutches 49 and 49' are so mounted as to be operative in reversed directions: that is, one will lock its cable when it moves in a predetermined direction while the other will allow displacement of its corresponding cable and vice-versa as will be explained hereinafter.

As mentioned previously, two eccentric discs 37, 37' are mounted in apertures 35, 35' of blocks 21, 21' and means are provided to lock discs 37, 37' so that they may rotate in unison within apertures 53, 35'. The purpose for this is that disc 37 may be loosened and shifted in relation to the outer disc 37' so as to change the pitch of the cutting tool, that is the distance of reciprocation of rods 39, 39' which actuate the tool bed 9.

Operation of the device will now be described with particular reference to FIGURES 5 and 6.

For a better understanding of the operation, in FIGURES 5 and 6, the upper and lower frames 17, 19, have been shown separately.

As shown, upper frame 17 is displaceable within the guiding walls of housing 15 in a transversal direction only: the transversal direction being normal to the longitudinal direction of carrier 3 of FIGURE 1. On the other hand, block 21' is only allowed transversal displacement within the frame 17. Thus, as eccentric disc 37' rotates about shaft 23, frame 17 moves into an alternating rectilinear motion.

At the same time, the lower frame 19, which can only be displaced laterally in relation to the longitudinal axis of carrier 3, is also acted upon by the eccentric disc 37'. However, in this case the situation is different due to the independent unidirectional holding means mentioned above. In the illustration of FIGURE 5, when shaft 23 rotates, in the direction indicated by arrow a, the tendency would be for frame 19 to move from right to left. However, this movement is prevented by the upper unidirectional clutch 49 which is locked. On the other hand, lower clutch 49' being free, it will allow cable 41' to move therethrough from left to right. Under these conditions, if frame 19 is held stationary, then shaft 23, along with carrier 3, will move from left to right to the position of FIGURE 6. Therefore, during the first 180° rotation of shaft 23, the cutting tool will have moved from left to right a distance proportional to the size of eccentric disc 37'.

For the remaining 180° rotation of shaft 23, the situation is reversed. It can be seen in FIGURE 6. At this time, the tendency is for eccentric disc 37' to move frame 19 from left to right. Since unidirectional clutch 49 will allow this cable movement and clutch 49' lock its cable, then frame 19 will indeed move from left to right.

In effect, the cooperative action of blocks 21 and 21' respectively on eccentric 37 is equivalent to that of any conventional straight motion system of links.

It is thus seen that while upper frame 17 moves continuously in an alternating longitudinal direction, frame 19 moves laterally in only one direction, step-by-step. The composite movement is illustrated in dotted lines at 51 of FIGURE 2 wherein it can be seen that by properly choosing the crest to crest distance between cuts by adjusting inner disc 37 in relation to outer disc 37' (see FIGURE 3) a male and female part of a dovetail joint may be made of the required dimension.

Referring back to FIGURE 4, it is noticed that because the circular eccentrics 37 and 37' are made in one piece bar each change in crest to crest distance between cuts produced by rotation of eccentric 37' there can correspond only one value for the change in depth of the dovetail. In other words, for any depth setting of the machine there can correspond only one setting of the crest to crest distance between cuts.

In FIGURE 7, there is shown in section an embodiment whereby both crest to crest distance between cuts and depth of the dovetail cuts can be adjusted separately, thereby making it possible to select any pitch for a given depth and vice versa.

In the embodiment of FIGURE 7, it is seen that the eccentrics 37 and 37' of FIGURE 4 were demultiplied to form eccentrics 37a and b and 37'a and b.

The desired depth adjustment is set by appropriate rotation of eccentric 37a in eccentric 37'a. Similarly, the desired pitch adjustment is set by rotation of eccentric 37b in eccentric 37'b.

As it is not likely that the magnitudes of the separate depth and pitch would be equal, the introduction of such separate and unequal settings introduces an out of phase relation which must be destroyed by means of a third adjustment which consists in bringing the major axes of the two eccentrics 37'a and 37'b in perfect alignment with each other. It must, of course, be accepted that after having properly positioned eccentrics 37a and 37b in eccentrics 37'a and 37'b respectively, the eccentrics in each pair of cooperating eccentrics are clamped together in any known way, not shown. In order to align the major axes of the eccentrics 37'a and 37'b, it is sufficient to rotate one of the pairs of clamped together eccentrics about the shaft 23 until its major axis coincides with the major axis of the pair below. The two pairs of eccentrics are then clamped together in any known way.

In order to achieve still another degree of freedom, it may be convenient to be able to adjust the position of the cutter at the start of a cut. This can be accomplished by loosening or deactivating the unidirectional clutch or clutches which control the pitch movements of the cutter, then rotating the block of clamped together eccentrics 37a–37'a–37b–37'b about shaft 23 while longitudinally moving the carrier until the cutter is at the right position with respect to the pieces on which matching dovetail cuts must be cut. The unidirectional clutch is then reset, the block of eccentrics 37a–37'a–37b–37'b is clamped to the shaft 23, and the machine is now set to start operating.

Although specific embodiments of this invention have just been described, it will be understood that various modifications may be made thereto without departing from the spirit of the invention.

I claim:
1. A machine for imparting to a cutting tool the harmonic motion necessary to produce dovetail cuts, comprising:
   (a) a machine base;
   (b) a carrier mounted on said machine base for longitudinal displacement thereon;
   (c) a work holding device mounted on said machine base and transversally offset from said carrier;
   (d) a cutting tool assembly mounted on said carrier for transversal displacement thereon;
   (e) a first device for translating circular motion into rectilinear transverse motion and for communicating the latter to the cutting tool assembly and thereby setting same into reciprocal motion;
   (f) a second device for translating circular motion into rectilinear longitudinal motion and communicating the latter to the said carrier;
   (g) a means for absorbing one of the directional components of rectilinear longitudinal motion and thereby prevent communication thereof to the said carrier;
   (h) first power means to produce said circular motion;
   (i) second power means for rotating said cutting tool;
   (j) said first device comprising:
      a first rectangular frame on said carrier and transversely slidable thereon;
      a first block longitudinally slidable on said first rectangular frame;
      a rigidly secured connection linking said first rectangular frame and said cutting tool assembly;
      a first circular rotatable eccentric connected to a rotating shaft for action on said first block;
   (k) said second device comprising:
      a second rectangular frame on said carrier and longitudinally slidable thereon;
      a second block transversely slidable on said second rectangular frame;
      a unidirectional clutch device secured to the machine base for action on said second rectangular frame to prevent motion of said second rectangular frame in one longitudinal direction;
      a second circular rotatable eccentric connected to a rotating shaft for action on said second block.

2. A machine as claimed in claim 1, wherein the degree of eccentricity of the said first circular eccentric is adjustable by means of a first inner circular eccentric inside said first circular eccentric and rotatable therein and around said rotating shaft, additional means being provided for producing locking engagement between said first circular eccentric and first inner circular eccentric and between said first inner circular eccentric and said rotating shaft.

3. A machine for automatically imparting a harmonic motion to a cutting tool or the like, comprising:
   (a) a carrier;
   (b) means on which said carrier is freely mounted for displacement in a predetermined direction;
   (c) a tool bed slidably mounted on said carrier for alternating movement in a direction normal to said predetermined direction;
   (d) a first frame, within said carrier, displaceable along said normal direction and connected to said tool bed for imparting thereto the same displacement;
   (e) a second frame, within said carrier, displaceable along said predetermined direction;
   (f) a block within each of said frames displaceable in a directional normal to the direction of displacement of the corresponding frame;
   (g) a rotatable shaft extending through both said blocks;
   (h) at least one circular cam mounted on said shaft and cooperating with an aperture in each of said blocks for slidably moving said blocks in said frames;
   (i) independent unidirectional holding means for both said carrier and said second frame operable in reverse directions so that said carrier remains stationary when said second frame is moved in one direction by said cam acting on the second frame block, and said second frame remains stationary when said carrier is moved in a direction reverse said one direction by said cam acting on the second frame block.

4. A machine as claimed in claim 1, wherein said holding means comprises:
   (a) two cables each having the two ends connected to the sides of said carrier and of said second frame, respectively, and forming a closed circuit, and
   (b) a unidirectional clutch for each cable allowing movement of said cables in reverse directions, respectively.

5. A machine for automatically imparting a harmonic motion to a cutting tool or the like, comprising:
   (a) a carrier;
   (b) means on which said carrier is freely mounted for displacement in a predetermined direction;
   (c) a tool bed slidably mounted on said carrier for alternating movement in a direction normal to said predetermined direction;
   (d) a first frame, within said carrier, displaceable along said normal direction and connected to said tool bed for imparting thereto the same displacement;
   (e) a second frame, within said carrier, displaceable along said predetermined direction;
   (f) a block within each of said frames displaceable in a direction normal to the direction of displacement of the corresponding frame;
   (g) said blocks having registering circular apertures;
   (h) a rotatable driving shaft extending through and eccentrically of both said blocks;
   (i) a circular disc eccentrically fixed to said shaft and adapted to snugly fit into each aperture whereby rotation of said shaft causes slidable movement of said blocks in said frames, and
   (j) independent unidirectional holding means for both said carrier and said second frame and operable in reverse directions so as to cause said carrier to remain stationary when said second frame is moved in one direction by said eccentric disc acting on said second frame block, and said second frame remains stationary when said carrier is moved in a direction reverse said one direction by said eccentric disc acting on said second frame block.

6. A machine as claimed in claim 1, wherein said holding means comprises:
   (a) two cables each having the two ends connected to the sides of said carrier and of said second frame, respectively, and forming a closed circuit, and
   (b) a unidirectional clutch for each cable allowing movement of said cables in reverse directions.

7. A machine for automatically imparting a harmonic motion to a cutting tool or the like, comprising:
   (a) a carrier;
   (b) supporting means on which said carrier is mounted for slidable displacement in a predetermined direction;
   (c) a tool bed adapted to carry said cutting tool and mounted on said carrier for slidable alternating movement in a direction normal to said predetermined direction;
   (d) a first quadrilateral frame mounted within said carrier and connected to said tool bed;
   (e) guiding tracks parallel to said normal direction and between which said first frame is freely displaceable;
   (f) a second quadrilateral frame mounted within said carrier and below said first frame;
   (g) further guiding tracks, parallel to said predetermined direction, between which said second frame is freely displaceable;

(h) a quadrilateral block within each of said frames displaceable in a direction normal to the direction of displacement of the corresponding frames, said blocks having registering apertures;
(i) a vertical shaft extending through and eccentrically of both said blocks;
(j) means, within said carrier, for driving said shaft into rotation;
(k) a circular disc eccentrically fixed to said shaft and adapted to snugly fit into each aperture whereby rotation of said shaft causes slidable movement of said blocks in said frames, and
(l) independent unidirectional holding means for both said carrier and said second frame and operable in reverse directions so as to cause said carrier to remain stationary when said second frame is moved in one direction by said eccentric disc acting on said second frame block, and said second frame remains stationary when said carrier is moved in a direction reverse said one direction by said eccentric disc acting on said second frame block.

8. A machine as claimed in claim 1, wherein said holding means comprises:
(a) two cables each having the two ends connected to the sides of said carrier and of said second frame, respectively, and forming a closed circuit, and
(b) a unidirectional clutch for each cable allowing movement of said cables in reverse directions.

References Cited by the Examiner

UNITED STATES PATENTS

| | | | |
|---|---|---|---|
| 1,694,115 | 12/1928 | Bottcher | 144—87 |
| 2,345,383 | 3/1944 | Curtis | 74—50 |

FOREIGN PATENTS

| | | |
|---|---|---|
| 51,720 | 6/1936 | Denmark. |

WILLIAM W. DYER, Jr., *Primary Examiner.*

R. J. ZLOTNIK, *Assistant Examiner.*

UNITED STATES PATENT OFFICE
CERTIFICATE OF CORRECTION

Patent No. 3,272,244                  September 13, 1966

Joseph Nemec

It is hereby certified that error appears in the above numbered patent requiring correction and that the said Letters Patent should read as corrected below.

In the heading to the printed specification, lines 3 and 4, for "assignor of fifty percent to" read -- assignor to --.

Signed and sealed this 29th day of August 1967.

(SEAL)
Attest:

ERNEST W. SWIDER                  EDWARD J. BRENNER
Attesting Officer                      Commissioner of Patents